(12) United States Patent
Cook

(10) Patent No.: US 7,039,365 B1
(45) Date of Patent: May 2, 2006

(54) DETERMINING A WIRELESS CONFIGURATION FOR A RESIDENTIAL WIRELESS TRANSCEIVER

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 546 days.

(21) Appl. No.: 10/414,398

(22) Filed: Apr. 15, 2003

(51) Int. Cl.
H04B 17/00 (2006.01)

(52) U.S. Cl. .................. 455/67.13; 455/446; 455/450; 455/456.1

(58) Field of Classification Search ............... 455/63.1, 455/63.2, 67.11, 67.13, 67.15, 422.1, 426.1, 455/426.2, 446, 448, 450, 451, 452.1, 454, 455/456.1

See application file for complete search history.

(56) References Cited

U.S. PATENT DOCUMENTS 5,960,341 A * 9/1999 LeBlanc et al. ......... 455/426.1
6,590,878 B1 * 7/2003 Uchida et al. .............. 370/330
6,711,381 B1 * 3/2004 Cook et al. ................ 455/63.1
6,832,074 B1 * 12/2004 Borras-Chia et al. .... 455/67.13

* cited by examiner

Primary Examiner—Lee Nguyen

(57) ABSTRACT

A communication system comprises a residential wireless transceiver, a plurality of other fixed wireless transceivers, and a management system. The residential wireless transceiver generates and transmits a first signal. The other fixed wireless transceivers receive the first signal. The other fixed wireless transceivers then generate and transmit first report messages indicating characteristics of the first signal. The other fixed wireless transceivers also generate and transmit second signals. The residential wireless transceiver generates and transmits a second report message indicating characteristics of the second signals. The management system then determines the location of the residential wireless transceiver based on the characteristics of the first signal and the characteristics of the second signals. The management system determines the wireless configuration for the residential wireless transceiver based on the location of the residential wireless transceiver and the locations of the other fixed wireless transceivers.

22 Claims, 5 Drawing Sheets

US 7,039,365 B1

DETERMINING A WIRELESS CONFIGURATION FOR A RESIDENTIAL WIRELESS TRANSCEIVER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to systems, methods, and software that determine a wireless configuration for a wireless transceiver.

2. Description of the Prior Art

Besides voice telephony services, many residences today have access to other communication services such as access to the Internet. There are some communication devices that integrate various communication services. In one example, a residential integrated services hub provides voice telephony services and high speed access to the Internet. Thus, many different user communication devices such as phones and computers plug into the hub, and the hub is connected to a communication network such as the public switched telephone network and the Internet.

Some of these hubs use wireless communication to communicate with the user communication devices and other wireless communication devices in the area. One problem is these wireless communication devices may cause interference or signal degradation with each other. The configuration of a wireless communication device controls how it operates. For example, configuration parameters can include a range of frequency, range of power control at specified frequencies, and power ranges of the wireless signals the wireless communication device uses. Thus, the configuration of the wireless communication device is important to prevent interference or signal degradation with other wireless communication devices in the area.

Additionally, the location and geographical layout of the wireless communication devices in an area are important in determining their configuration. One method of determining a location of a wireless device uses a triangulation method of using the signal information from surrounding wireless devices to pinpoint the location. Typically, at least three surrounding wireless devices are needed to pinpoint a location.

SUMMARY OF THE INVENTION

The inventions solve the above problems by determining a wireless configuration for a residential wireless transceiver. A communication system comprises a residential wireless transceiver, a plurality of other fixed wireless transceivers, and a management system. The residential wireless transceiver is fixed in a location during operation. The residential wireless transceiver generates and transmits a first signal. The other fixed wireless transceivers receive the first signal. The other fixed wireless transceivers then generate and transmit first report messages indicating characteristics of the first signal. The other fixed wireless transceivers also generate and transmit second signals. The residential wireless transceiver receives the second signals. The residential wireless transceiver generates and transmits a second report message indicating characteristics of the second signals. The management system receives the first report messages and the second report message. The management system then determines the effective location of the residential wireless transceiver based on the characteristics of the first signal and the characteristics of the second signals. The management system determines the wireless configuration for the residential wireless transceiver based on the location of the residential wireless transceiver and the locations of the other fixed wireless transceivers.

In some embodiments, the characteristics comprise signal strength, signal quality, and/or signal intensity. In some embodiments, the wireless configuration comprises one or more frequencies for wireless signals to be transmitted by the residential wireless transceiver. In some embodiments, the wireless configuration comprises a signal power for wireless signals to be transmitted by the residential wireless transceiver. In some embodiments, the first signal and the second signals are on an administrative channel for wireless signals. In some embodiments, the management system determines approximate distances between the residential wireless transceiver and the other fixed wireless transceivers. In some embodiments, the management system calculates circles around the other fixed wireless transceivers based on the approximate distances and determines the location of the residential wireless transceiver based on intersections of the circles.

The invention advantageously enables auto setup for a wireless configuration of a residential wireless transceiver based on local conditions, and on the presence/location of other existing wireless transceivers of a same communication system.

BRIEF DESCRIPTION OF THE DRAWINGS

The same reference number represents the same element on all drawings.

DETAILED DESCRIPTION OF THE INVENTION

FIGS. 1–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
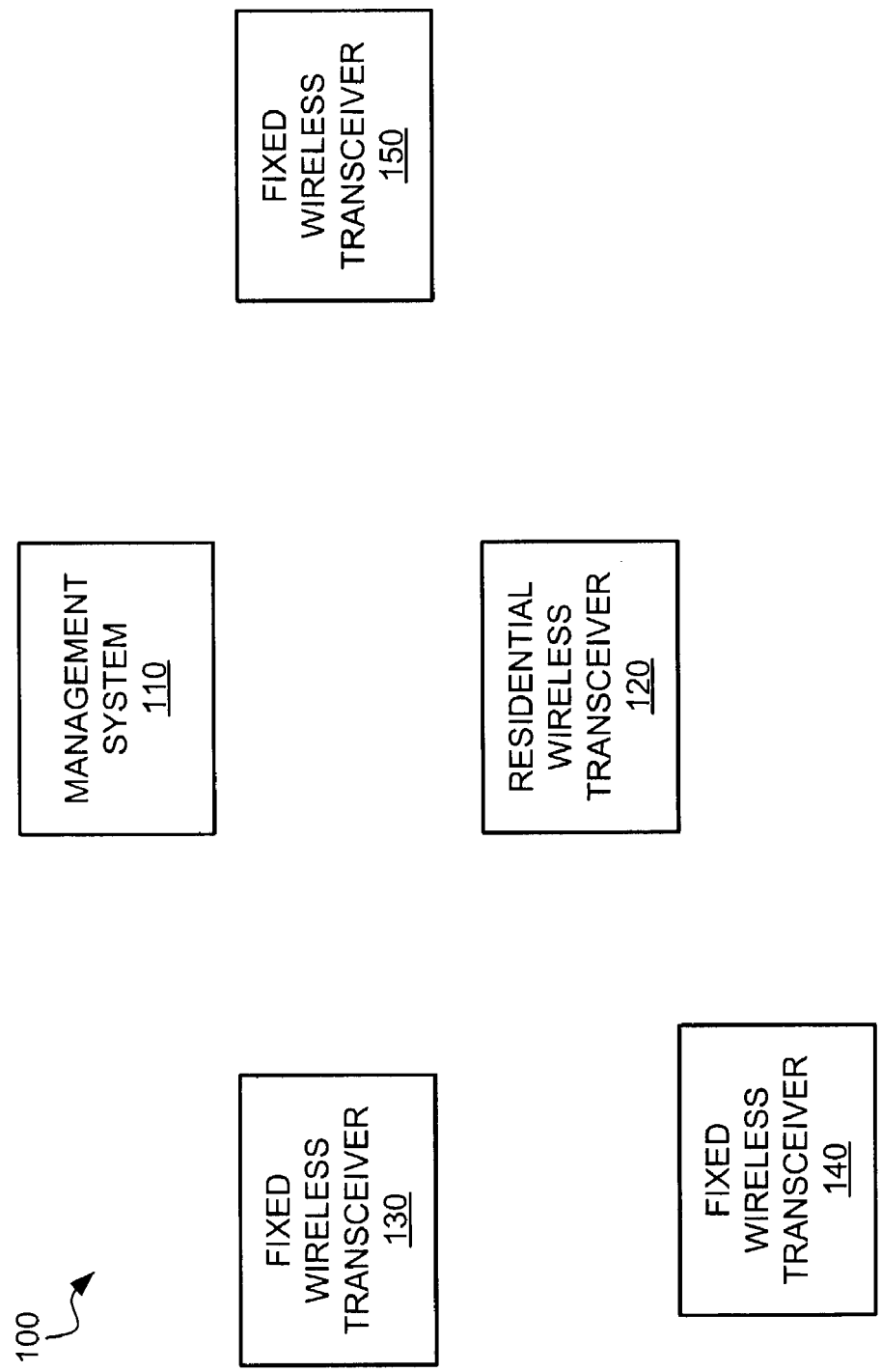
FIG. 1 is a block diagram of a communication network in an example of the invention.
Figure 2:
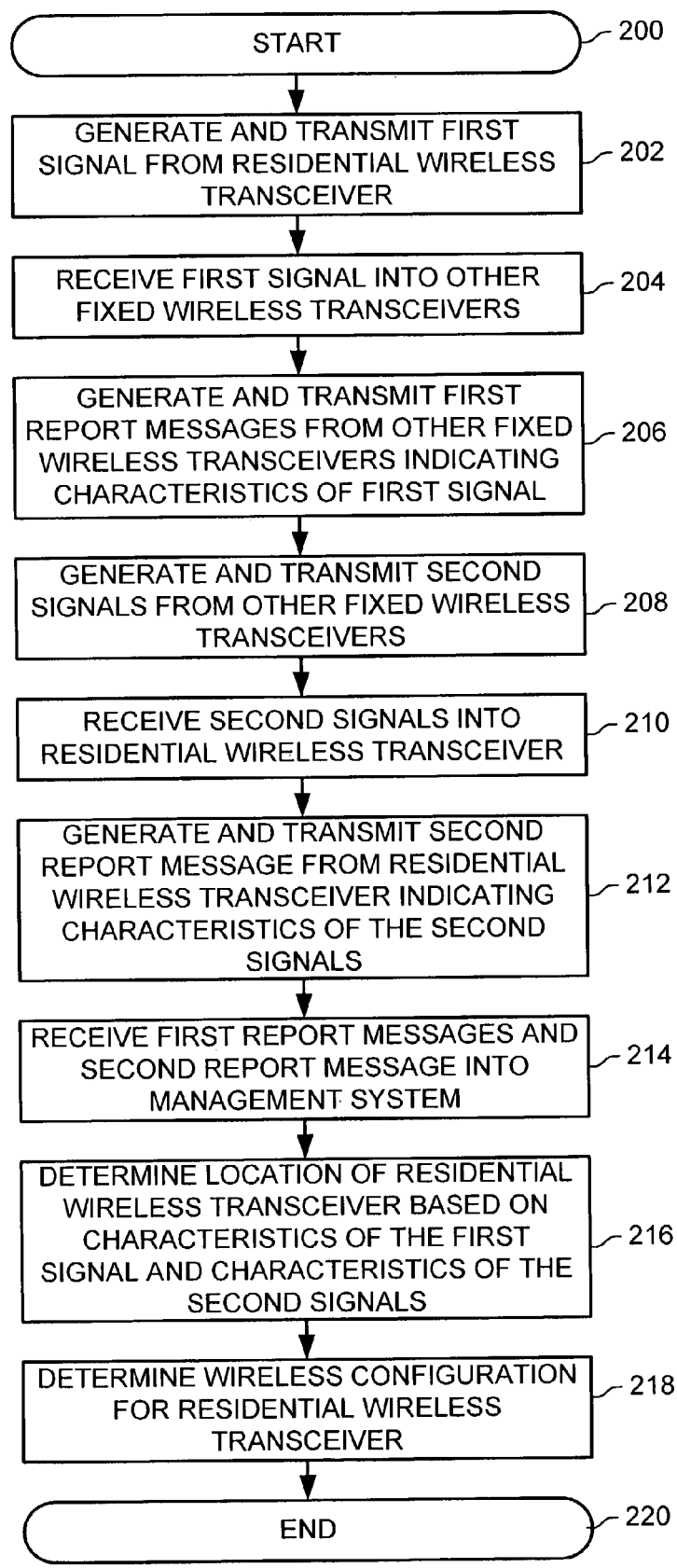
FIG. 2 is a flow chart for the communication network in an example of the invention.

Determining a Wireless Configuration for a Residential Wireless Transceiver—FIGS. 1–2

FIG. 1 depicts a block diagram of a communication network 100 in an example of the invention. The communication network 100 includes a management system 110, a residential wireless transceiver 120, a fixed wireless transceiver 130, a fixed wireless transceiver 140, and a fixed wireless transceiver 150. Each of the systems and transceivers communicate with each other using wireless communications. The management system 110 may communicate with the residential wireless transceiver 120 and the fixed wireless transceivers 130, 140, and 150 through wireless or wire line communications. In this example, only three fixed wireless transceivers are shown for the sake of simplicity. In other examples, there may be numerous fixed wireless transceivers that the residential wireless transceiver 120 communicates with. Management system 110 may be combined with on of the transceivers.

The residential wireless transceiver 120 is any device, group of devices, or system that is fixed in a location during operation and configured to (1) generate and transmit a first signal, (2) receive second signals from the fixed wireless transceivers 130, 140, and 150, and (3) generate and transmit second report messages indicating characteristics of the second signals. Some examples of the residential wireless device 120 are residential integrated service hubs (RISH), which are described below. The fixed wireless transceivers 130, 140 and 150 are any device, group of devices, or system that are fixed in a location during operation and configured to (1) receive a first signal from the residential wireless transceivers 120, (2) generate and transmit first report messages to the management system indicating characteristics of the first signal, and (3) generate and transmit second signals. Some examples of the fixed wireless transceivers are a RISH device and a radio tower, which are described below.

The first signal comprises any wireless signal that is transmitted from the residential wireless transceiver 120 and that has characteristics. Characteristics of a wireless signal are any property or quality of a wireless signal. Some examples of characteristics are signal strengths, power, or intensity of signals. The second signals comprise any wireless signals that are transmitted from the fixed wireless transceivers 130, 140, or 150 and that have characteristics. The first report messages are any messages, signals, or instructions that are transmitted from the fixed wireless transceivers 130, 140, or 150 to the management system 110 and that indicate the characteristics of the first signals as received by the fixed wireless transceivers 130, 140 and 150. The second report messages are any messages, signals, or instructions that are transmitted from the residential wireless transceiver 120 to the management system 110 and that indicate the characteristics of the second signals.

The management system 110 is any device, group of devices, or system configured to (1) receive first report messages and second report messages, (2) determine a location of the residential wireless transceiver 120 based on the characteristics of the first signal and the characteristics of the second signals, and (3) determine a wireless configuration for the residential wireless transceiver 120 based on the location of the residential wireless transceiver 120 and the locations of the fixed wireless transceiver 130, the fixed wireless transceiver 140, and the fixed wireless transceiver 150. One example of the management system 110 is a service provider device, which is described below. The wireless configuration of the residential wireless transceiver 120 is any setting, property, or adjustment of the residential wireless transceiver 120 for wireless communications. Some examples of the wireless configuration are ranges of frequency and power for wireless communications. The invention advantageously enables auto setup for a wireless configuration of a residential wireless transceiver based on local conditions, and on the presence/location of other existing wireless transceivers of a same communication system.

FIG. 2 depicts a flow chart of the communication network 100 in an example of the invention. FIG. 2 begins in step 200. In step 202, the residential wireless transceiver 120 generates and transmits a first signal. In step 204, the fixed wireless transceivers 130, 140, and 150 receive the first signal. In step 206, the fixed wireless transceivers 130, 140, and 150 generate and transmit first report messages indicating the characteristics of the first signal. In step 208, the fixed wireless transceivers 130, 140, and 150 generate and transmit second signals. In step 210, the residential wireless transceiver 120 receives the second signals. In step 212, residential wireless transceiver 120 generates and transmits the second report message indicating the characteristics of the second signals. In step 214, the management system 110 receives the first report messages and the second report message. In step 216, the management system 110 determines the location of the residential wireless transceiver 120 based on the characteristics of the first signal and the characteristics of the second signals. In step 218, the management system 110 determines a wireless configuration for the residential wireless transceiver 120 based on the location of the residential wireless transceiver 120 and the locations of the fixed wireless transceiver 130, the fixed wireless transceiver 140, and the fixed wireless transceiver 150. FIG. 2 ends in step 220.

Figure 3:
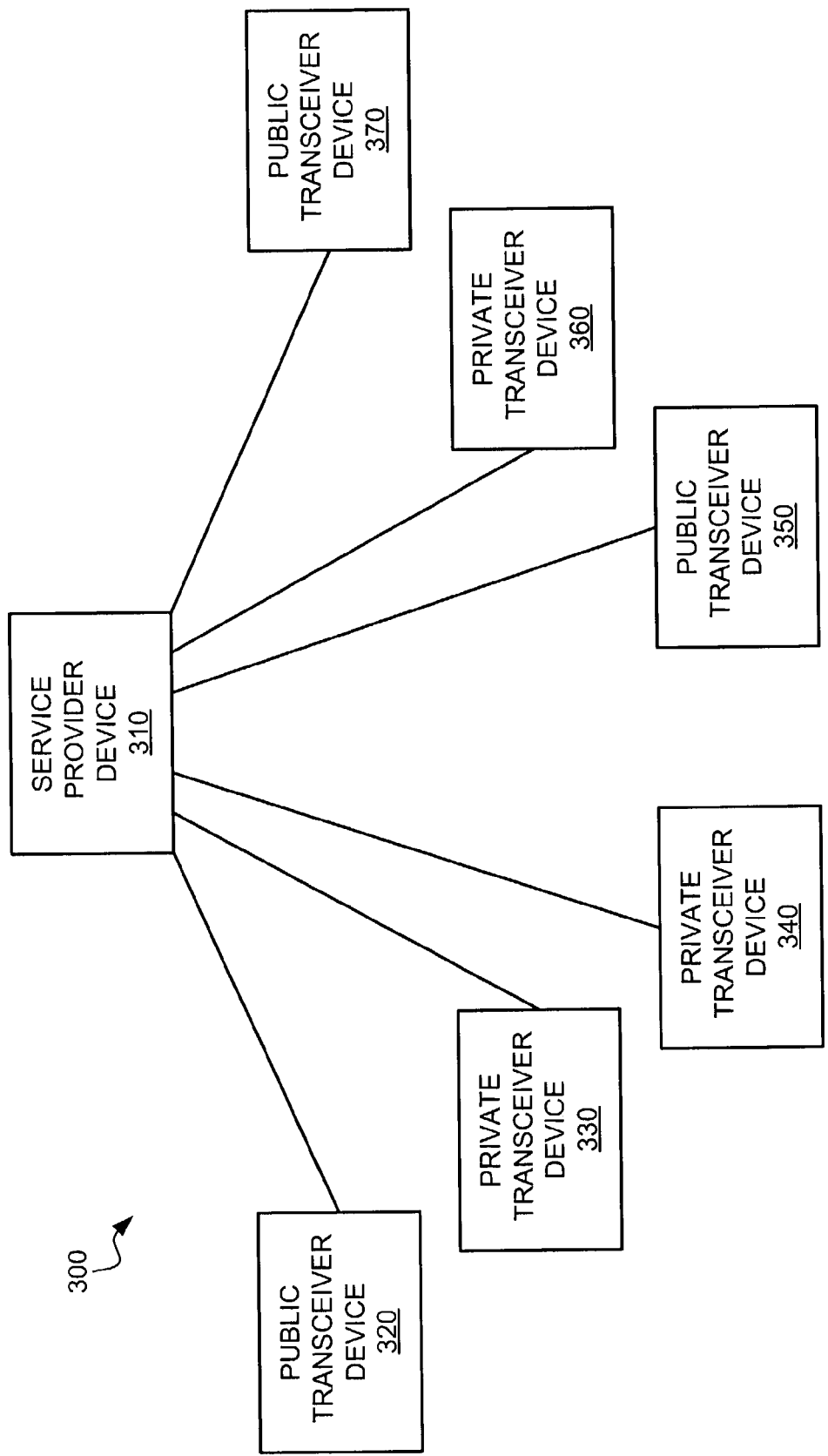
FIG. 3 is a block diagram of a communication network in an example of the invention.
Figure 4:
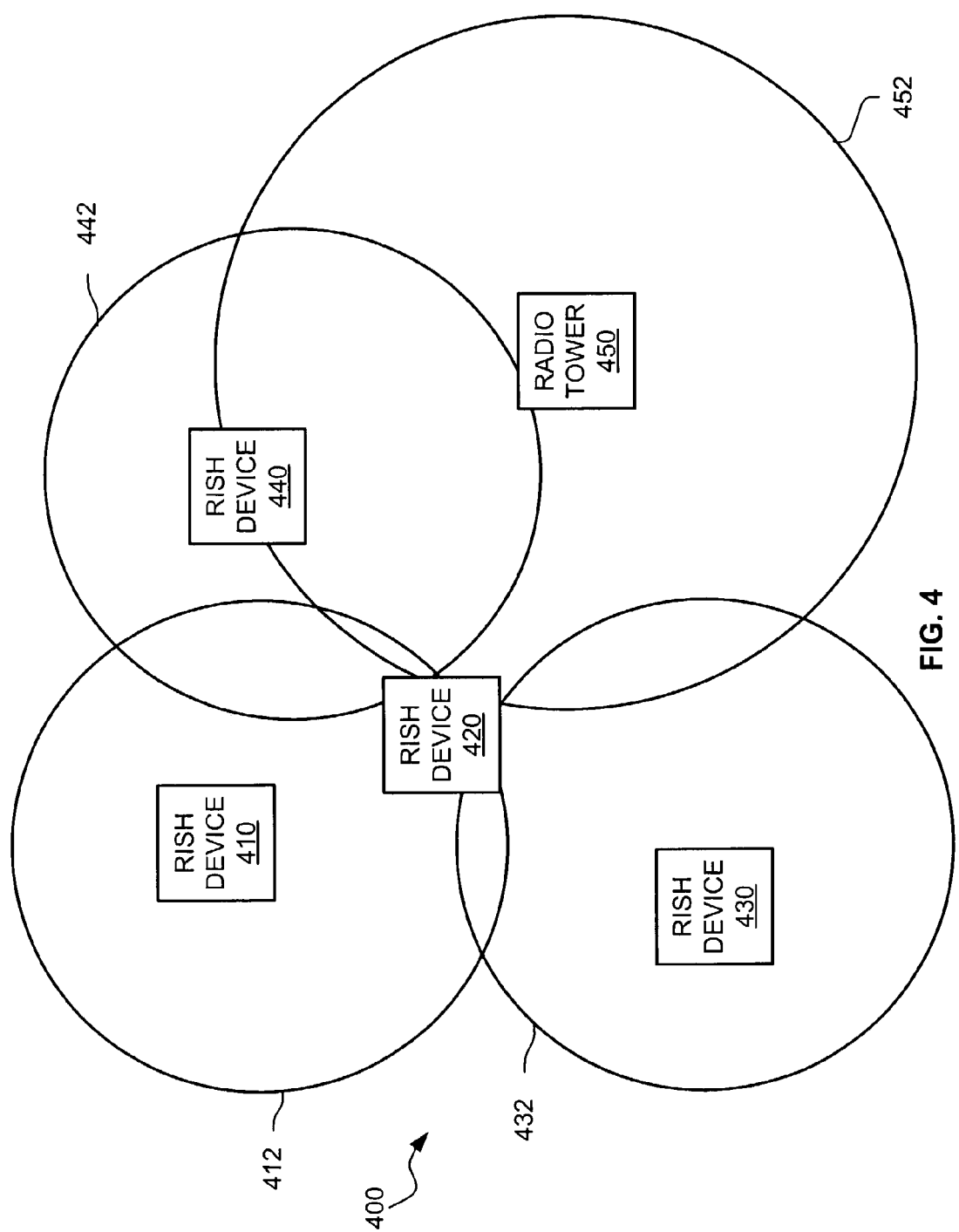
FIG. 4 is an illustration of a communication network in an example of the invention.
Figure 5:
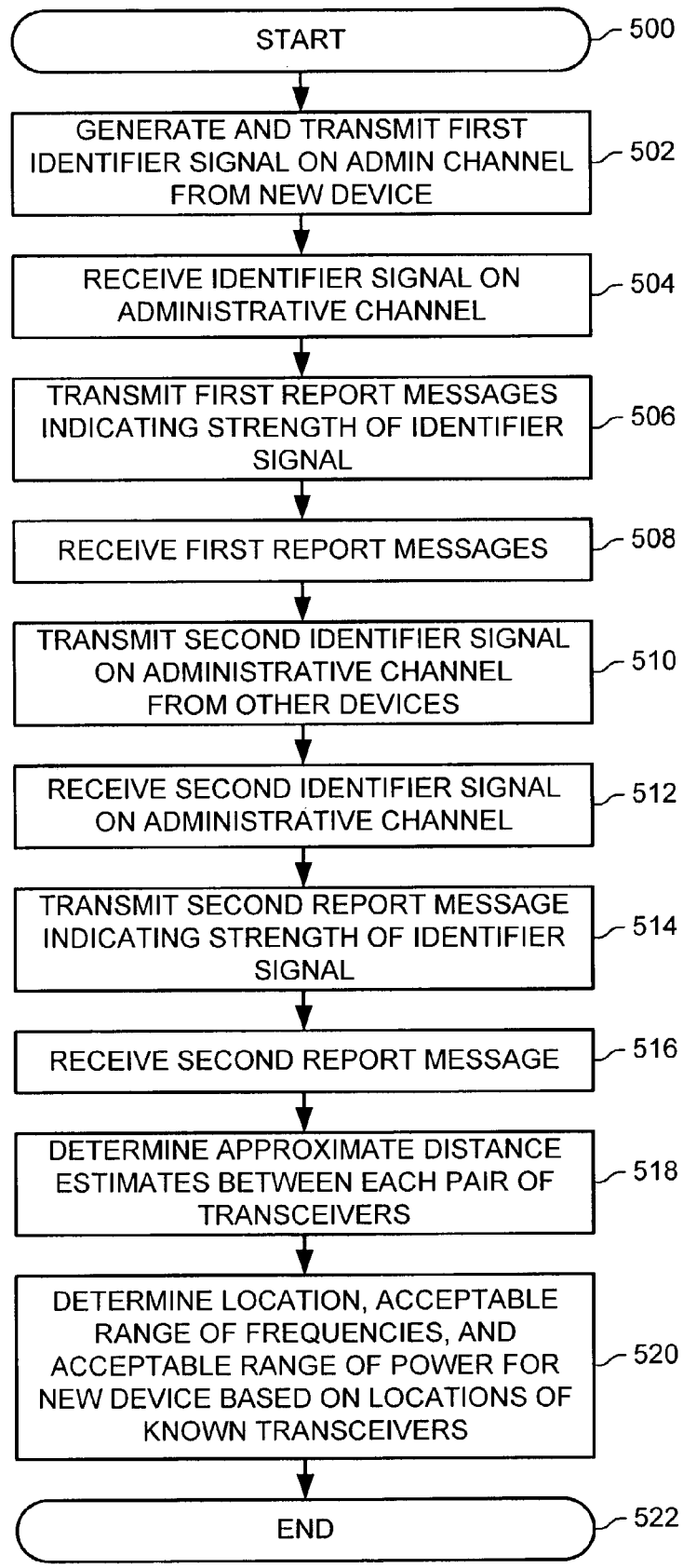
FIG. 5 is a flow chart for a communication network in an example of the invention.

Determining a Wireless Configuration of a Private Transceiver Device—FIGS. 3–5

FIG. 3 depicts a block diagram of a communication network 300 in an example of the invention. The communication network 300 includes a service provider device 310, a public transceiver device 320, a private transceiver device 330, a private transceiver device 340, a public transceiver device 350, a private transceiver device 360, and a public transceiver device 370. The service provider device 310 is connected to the public transceiver device 320, the private transceiver device 330, the private transceiver device 340, the public transceiver device 350, the private transceiver device 360, and the public transceiver device 370. In this example, the service provider device 310 communicates with the public transceiver device 320, the private transceiver device 330, the private transceiver device 340, the public transceiver device 350, the private transceiver device 360, and the public transceiver device 370 through wire line communications. In other embodiments, the service provider device 310 communicates using wireless communications. FIG. 3 shows how the wireless transceiver devices communicate with the service provider device 310.

FIG. 4 depicts an illustration of a communication network 400 in an example of the invention. In FIG. 4, the private transceiver devices of FIG. 3 are residential integrated service hub (RISH) devices. The public transceiver devices of FIG. 3 are radio towers. The communication network 400 includes a RISH device 410, a RISH device 420, a RISH device 430, a RISH device 440, and a radio tower 450. The elements within the communication network 400 are wireless devices that have a certain range that the wireless signals operate in. For instance, the signal strength of RISH device 420 is based on a given transmission power. The RISH device 410 has a wireless range 412. The RISH device 430 has a wireless range 432. The RISH device 440 has a wireless range 442. The radio tower 450 has a wireless range 452. The service provider device 310 is not shown in FIG. 4 to focus on the wireless ranges of the RISH device and the public tower.

FIG. 5 depicts a flow chart for the communication network 400 in an example of the invention. FIG. 5 begins in step 500. In this example, the RISH device 420 is the new residential wireless device that has just been installed and needs configuration relative to the other wireless devices in the area. Also, in this example, the service provider device 310 functions as the management system. In step 502, the new RISH device 420 generates and transmits a first identifier signal on an administrative channel when the new RISH device 420 is initially powered on. The surrounding fixed wireless devices such as the RISH device 410, the RISH device 430, the RISH device 440, and the radio tower 450 receive the first identifier signal on the administrative channel in step 504. In step 506, the RISH device 410, the RISH device 430, the RISH device 440, and the radio tower 450 each transmit a first report message indicating the strength of the first identifier signal to the service provider device 310. In step 508, the service provider device 310 then receives the first report messages indicating the received/measured strengths of the first identifier signal.

The service provider device 310 then sequentially requests that each surrounding fixed wireless device transmit its own identifier signal over the administrative channel. In step 510, each of the RISH devices 410, 430, and 440 and the radio tower 450 sequentially transmit a second identifier signal on the administrative channel. In step 512, the new RISH device 420 then receives the second identifier signal on the administrative channel. In step 514, the new RISH device 420 transmits a second report message indicating the received/measured strength of the second identifier signal to the service provider device 310. In step 516, the service provider device 310 receives the second report message. In step 518, the service provider device 310 determines the approximate distance between each pair of the RISH device 420 and the other fixed wireless devices using power dissipation calculations.

In step 520, the service provider device 310 determines the location, an acceptable range of frequencies, and the acceptable range of power for the new RISH device 420 based on the locations of the other known fixed wireless devices. Specifically, the service provider device 310 calculates circles with a radius equal to the calculated distance between the new RISH device 420 and the other known fixed wireless devices using the known location of the public transceivers such as the radio tower 450 and the calculated location of pre-existing private wireless devices such as the RISH device 410, the RISH device 430, and the RISH device 440. The circles are centered around each known fixed wireless device. The "logical" distance is calculated as a factor of the ratio of the transmit power to observed power. The service provider device 310 then determines the location of the RISH device 420 by the intersection approximated by any three previously known transceiver circles. The service provider device 310 then determines which frequencies the RISH device 420 can use and at what power ratings using power dissipation calculations. FIG. 5 ends in step 522.

The service provider device 310 may direct the RISH devices 410, 430, and 440 to alter their characteristics to accommodate RISH device 420. The service provider device 310 may shuffle the allowed frequencies of existing private devices based upon the density of current RISH devices and new RISH device additions.

What is claimed is:

1. A method of determining a wireless configuration for a residential wireless transceiver, the method comprising:
generating and transmitting a first signal from the residential wireless transceiver, wherein the residential wireless transceiver is fixed in a location during operation;
receiving the first signal into a plurality of other fixed wireless transceivers wherein the other fixed wireless transceivers are fixed in locations during operation;
generating and transmitting first report messages from the other fixed wireless transceivers indicating characteristics of the first signal;
generating and transmitting second signals from the other fixed wireless transceivers;
receiving the second signals into the residential wireless transceiver;
generating and transmitting a second report message from the residential wireless transceiver indicating characteristics of the second signals;
receiving the first report messages and the second report message into a management system;
in the management system, determining the location of the residential wireless transceiver based on the characteristics of the first signal and the characteristics of the second signals; and
in the management system, determining the wireless configuration for the residential wireless transceiver based on the location of the residential wireless transceiver and the locations of the other fixed wireless transceivers.

2. The method of claim 1 wherein the characteristics comprise signal strength.

3. The method of claim 1 wherein the characteristics comprise signal quality.

4. The method of claim 1 wherein the characteristics comprise signal intensity.

5. The method of claim 1 wherein the wireless configuration comprises a frequency for wireless signals from the residential wireless transceiver.

6. The method of claim 1 wherein the wireless configuration comprises a signal power for wireless signals from the residential wireless transceiver.

7. The method of claim 1 wherein the first signal and the second signals are on an administrative channel for wireless signals.

8. The method of claim 1 further comprising determining approximate distances between the residential wireless transceiver and the other fixed wireless transceivers.

9. The method of claim 8 further comprising:
calculating circles around the other fixed wireless transceivers based on the approximate distances; and
determining the location of the residential wireless transceiver based on intersections of the circles.

10. The method of claim 1 wherein determining the location of the residential wireless transceiver based on the characteristics of the first signal and the characteristics of the second signals uses power dissipation calculations.

11. The method of claim 1 wherein determining the wireless configuration for the residential wireless transceiver based on the location of the residential wireless transceiver and the locations of the other fixed wireless transceivers uses power dissipation calculations.

12. A communication system comprising:
- a residential wireless transceiver fixed in a location during operation and configured to generate and transmit a first signal, receive second signals, and generate and transmit a second report message indicating characteristics of the second signals;
- a plurality of other fixed wireless transceivers fixed in locations during operation and configured to receive the first signal, generate and transmit first report messages indicating characteristics of the first signal, and generate and transmit the second signals; and
- a management system configured to receive the first report messages and the second report message, determine the location of the residential wireless transceiver based on the characteristics of the first signal and the characteristics of the second signals, and determine the wireless configuration for the residential wireless transceiver based on the location of the residential wireless transceiver and the locations of the other fixed wireless transceivers.

13. The communication system of claim 12 wherein the characteristics comprise signal strength.

14. The communication system of claim 12 wherein the characteristics comprise signal quality.

15. The communication system of claim 12 wherein the characteristics comprise signal intensity.

16. The communication system of claim 12 wherein the wireless configuration comprises a frequency for wireless signals from the residential wireless transceiver.

17. The communication system of claim 12 wherein the wireless configuration comprises a signal power for wireless signals from the residential wireless transceiver.

18. The communication system of claim 12 wherein the first signal and the second signals are on an administrative channel for wireless signals.

19. The communication system of claim 12 wherein the management system is configured to determine approximate distances between the residential wireless transceiver and the other fixed wireless transceivers.

20. The communication system of claim 19 wherein the management system is configured to calculate circles around the other fixed wireless transceivers based on the approximate distances and determine the location of the residential wireless transceiver based on intersections of the circles.

21. The communication system of claim 12 wherein the management system is configured to determine the location of the residential wireless transceiver based on the characteristics of the first signal and the characteristics of the second signals using power dissipation calculations.

22. The communication system of claim 12 wherein the management system is configured to determine the wireless configuration for the residential wireless transceiver based on the location of the residential wireless transceiver and the locations of the other fixed wireless transceivers using power dissipation calculations.

* * * * *